(12) United States Patent
Shankar et al.

(10) Patent No.: US 10,931,216 B1
(45) Date of Patent: Feb. 23, 2021

(54) MOTOR STEPPER DRIVER HAVING A SINE DIGITAL-TO-ANALOG CONVERTER

(71) Applicant: TEXAS INSTRUMENTS INCORPORATED, Dallas, TX (US)

(72) Inventors: Krishnamurthy Shankar, Bengaluru (IN); Venkata Naresh Kotikelapudi, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/747,673

(22) Filed: Jan. 21, 2020

Related U.S. Application Data

(60) Provisional application No. 62/886,981, filed on Aug. 15, 2019, provisional application No. 62/954,332, filed on Dec. 27, 2019.

(51) Int. Cl.
*H02P 8/00* (2006.01)
*H02P 8/22* (2006.01)

(52) U.S. Cl.
CPC ..................... *H02P 8/22* (2013.01)

(58) Field of Classification Search
CPC ........................................... H02P 8/22
USPC ........................................ 318/696
See application file for complete search history.

(56) References Cited

U.S. PATENT DOCUMENTS

| 6,064,174 | A | * | 5/2000 | Sziebert | ............... | H02P 25/034 |
|---|---|---|---|---|---|---|
| | | | | | | 318/254.2 |
| 2011/0188163 | A1 | * | 8/2011 | Ando | ...................... | H03K 5/22 |
| | | | | | | 361/57 |
| 2013/0314958 | A1 | * | 11/2013 | Kern | ................ | H02M 7/53871 |
| | | | | | | 363/80 |
| 2014/0028234 | A1 | * | 1/2014 | Lee | .......................... | H02P 7/04 |
| | | | | | | 318/490 |
| 2015/0236592 | A1 | * | 8/2015 | Inoue | .................... | H02P 29/68 |
| | | | | | | 318/445 |
| 2016/0043667 | A1 | * | 2/2016 | Aiura | ....................... | H02P 3/14 |
| | | | | | | 318/376 |
| 2016/0344327 | A1 | * | 11/2016 | Lopez | .................. | H02P 25/034 |

* cited by examiner

*Primary Examiner* — Erick D Glass
(74) *Attorney, Agent, or Firm* — John R. Pessetto; Charles A. Brill; Frank D. Cimino

(57) ABSTRACT

A stepper driver for a motor includes an H-bridge, a sense transistor coupled to the H-bridge, a voltage-to-current (VtoI) converter, and a sine digital-to-analog converter (DAC). The VtoI converter has a VtoI converter input and a VtoI converter output. The VtoI converter output is coupled to the sense transistor. The sine DAC has a sine DAC digital input, a reference input, and a sine DAC output. The sine DAC output is coupled to the VtoI converter input. The sine DAC includes an R-2R network, an offset control circuit coupled to the R-2R network, and a gain control circuit also coupled to the R-2R network.

20 Claims, 7 Drawing Sheets

MOTOR STEPPER DRIVER HAVING A SINE DIGITAL-TO-ANALOG CONVERTER

CROSS-REFERENCE TO RELATED APPLICATIONS

This application claims priority to U.S. Provisional Application No. 62/886,981, filed Aug. 15, 2019, and U.S. Provisional Application No. 62/954,332, filed Dec. 27, 2019, which are hereby incorporated by reference.

BACKGROUND

At least one type of stepper rotor includes two cons that receive current from a stepper driver. The current to each coil should be sinusoidal with the current to one coil being 90 degrees out of phase with respect to the current to the other coil. The angular position of the stepper motor is a function of the ratio of the magnitude of the currents through the cons (e.g., the arctangent of the ratio of the magnitudes). Inaccuracies in the coil current magnitudes can cause inaccuracies in the rotational position of the motor.

SUMMARY

In at least one example, a stepper driver for a motor includes an H-bridge, a sense transistor coupled to the H-bridge, a voltage-to-current (Vtol) converter, and a sine digital-to-analog converter (DAC). The Vtol converter has a Vtol converter input and a Vtol converter output. The Vtol converter output is coupled to the sense transistor. The sine DAC has a sine DAC digital input, a reference input, and a sine DAC output. The sine DAC output is coupled to the Vtol converter input. The sine DAC includes an R-2R network, an offset control circuit coupled to the R-2R network, and a gain control circuit also coupled to the R-2R network.

BRIEF DESCRIPTION OF THE DRAWINGS

For a detailed description of various examples, reference will now be made to the accompanying drawings in which.

DETAILED DESCRIPTION

One type of stepper driver includes multiple current source devices (e.g., transistors) that can be operationally switched in and out of the circuit to provide a variable trip current to thereby control the current to the coils. Each current source may be configured for the same current (e.g., 1 micro-amp). By switching on two current sources in parallel, a two micro-amp trip current is generated. Three current sources in parallel produces a three micro-amp trip current, and so on. This type of stepper driver is useful for ¼ micro-stepping in which four current levels, and thus four motor positions, are possible for each quarter cycle of the sinusoidal current.

To increase the resolution of the positional control over the stepper motor, higher levels of micro-stepping should be implemented, such as ¹⁄₂₅₆, ¹⁄₁₀₂₄, ¹⁄₄₀₉₆, etc. Higher resolution stepper motors are useful in a variety of applications such as camera zoom. One approach to increasing the micro-stepping level of a stepper motor would be to increase the number of the current sources, with each current source providing less current than in the ¼ micro-stepping case. However, at smaller and smaller levels of current, current mismatch among the current source devices becomes a bigger problem. Larger area transistors could be used for the current sources to thereby address the mismatch problem, but larger transistors occupy more area on a die and have larger parasitic capacitances which, in turn, increases the settling time when changing from one current level to another. Further, quiescent current of a current source-based current control for a stepper motor can be undesirably large. Power supply headroom also can be problematic particularly when lower power supply voltages are desired.

The examples disclosed herein are directed to a stepper driver that includes a sine digital-to-analog converter (DAC). The sine DAC receives digital code inputs and produces an analog output voltage that has an approximately sinusoidal relationship to the digital code input. A voltage-to-current (Vtol) converter then converts the sine DAC output voltage to the trip current to control the current through the stepper motor's coils. The sine DAC includes an R-2R network, an offset control circuit, and a gain control circuit. Absent the gain and offset control circuits, the relationship between the R-2R network's output voltage and its digital code input is generally linear. The gain and offset control circuits operate to modify the R-2R networks' linear transfer function to one that is approximately sinusoidal.

Figure 1:
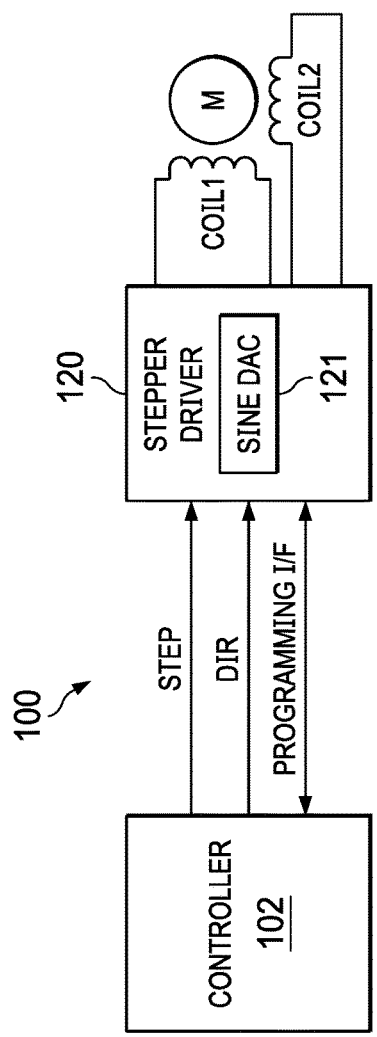
FIG. 1 illustrates an example of a stepper motor system.

FIG. 1 shows an example of a stepper motor system 100. The example stepper motor system 100 includes a controller 102 coupled to a stepper motor driver 120, which in turn couples to a stepper motor M. The stepper motor M includes Coil 1 and Coil 2, and the stepper driver 120 controls the current through the coils. The current through the coils is approximately sinusoidal and the current through Coil 2 is 90 degrees out of phase with respect to Coil 1.

In one example, the controller 102 includes a processor or other type of digital control circuit. The controller 102 couples to the stepper driver 120 by way of a STEP signal, a direction (DIR) signal, and a programming interface. The programming interface may comprise any suitable interface such as a serial peripheral interconnect (SPI). Each rising edge of the STEP signal causes the stepper driver 120 to advance the motor's position one step, and the DIR signal specifies the direction of the motor change (forward or reverse). The stepper driver 120 includes a sine DAC 121 (described below).

Figure 2:
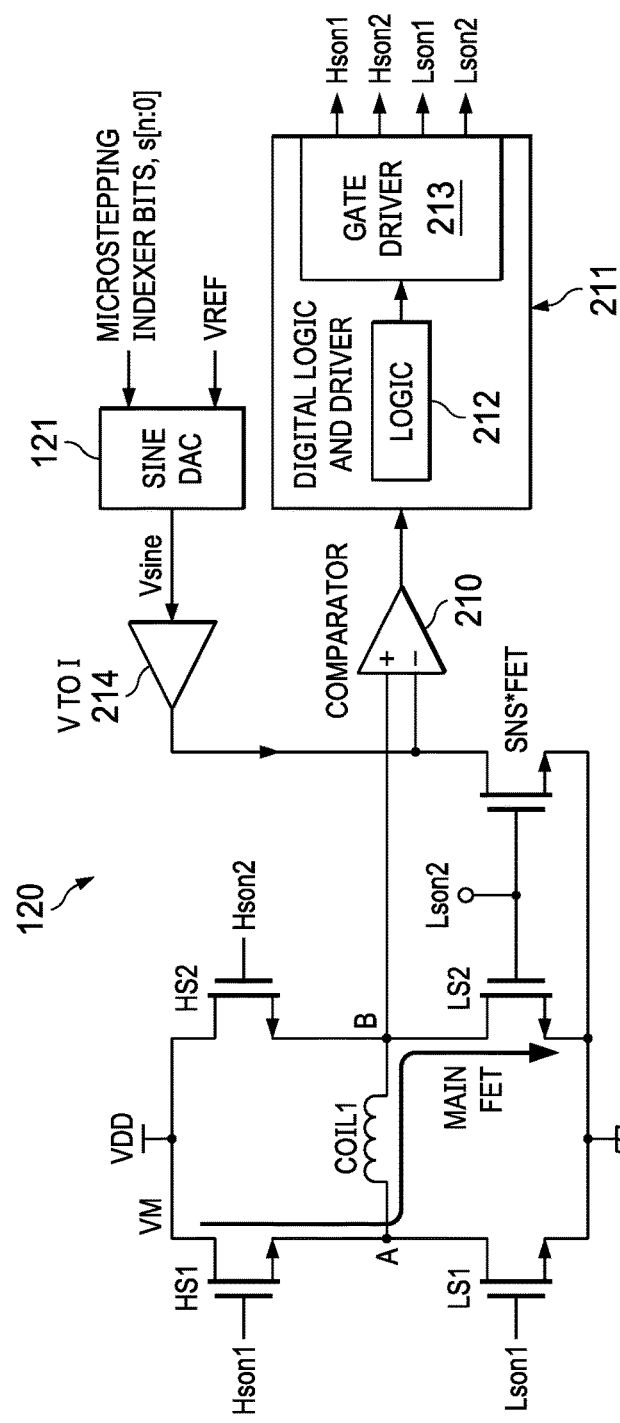
FIG. 2 shows an example of the stepper driver including a sine digital-to-analog converter (DAC).
Figure 9:
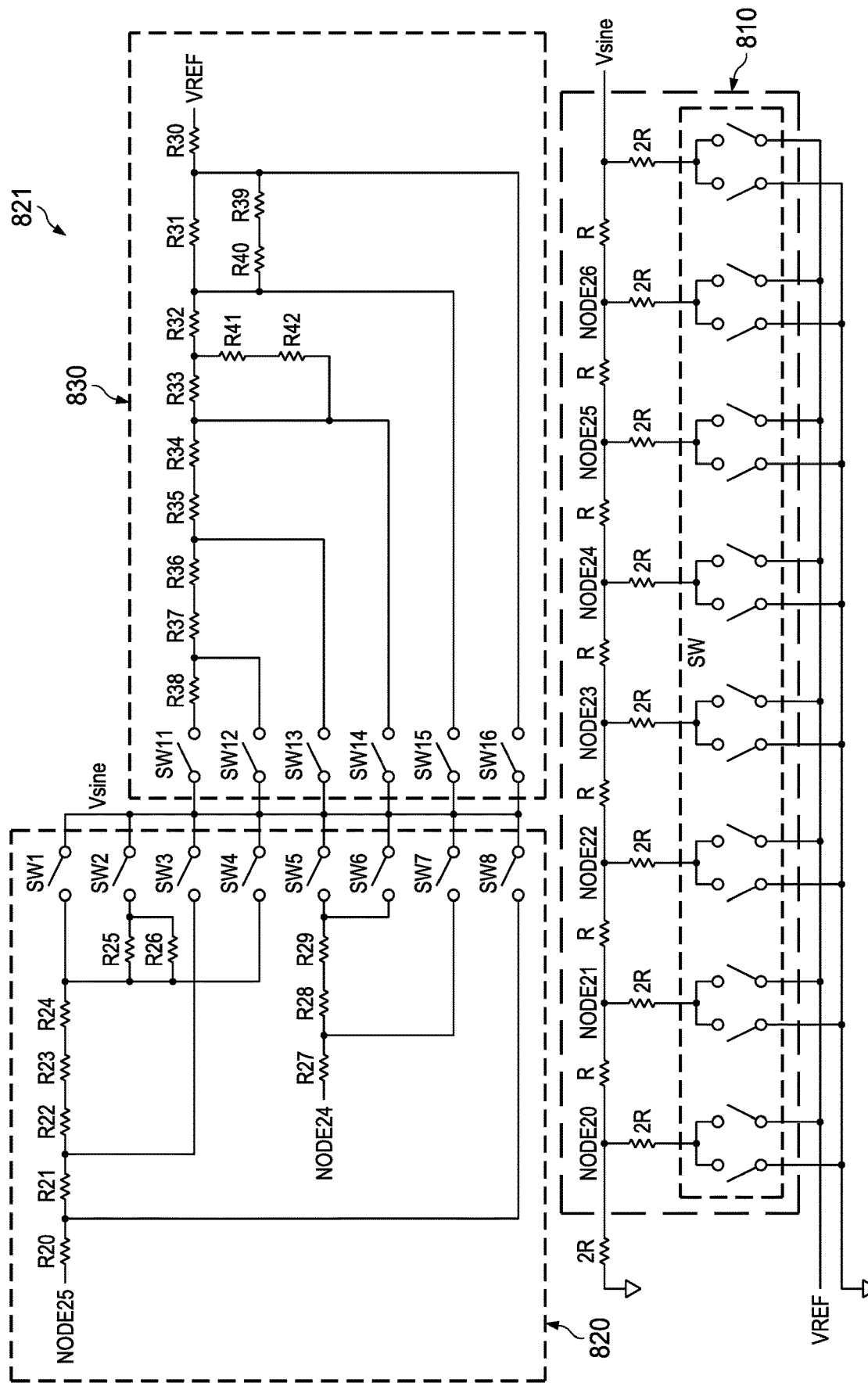
FIG. 9 shows yet a further example implementation of the sine DAC.

FIG. 2 illustrates an example of at least a portion of the stepper driver 120. Coil 1 is shown in this schematic, but the coil itself is generally not a component of the semiconductor die containing the other components shown for the stepper driver 120. In this example, the stepper driver 120 includes high side transistors HS1 and HS2, low side transistors LS1 and LS2, a comparator 210, a digital logic and driver 211, a voltage-to-current (Vtol) converter 214, and the sine DAC 121. Each of transistors HS1, HS2, LS1, and LS2 may comprise metal oxide semiconductor field effect transistors (FETs). Transistors HS1, HS2, LS1, and LS2 in this example comprise n-type FETs (NMOS) but can be implemented as other types of transistors as desired. The stepper driver 120 also includes a sense transistor (SNS FET). Transistors HS1, HS2, LS1, and LS2 are coupled together to form an H-bridge. As shown in the example of FIG. 2, the drains of HS1 and HS2 are coupled together at a positive supply voltage node (VDD), and the sources of LS1 and LS2 are coupled together at a ground node. The source of HS1 is connected to the drain of LS1 at a node A. Similarly, the source of HS2 is connected to the drain of LS2 at a node B. One coil (e.g., Coil 1) of the motor is coupled between nodes A and B. A separate H-bridge and sense FET is provided for the other coil (Coil 2). FIG. 9 shows an example of a stepper driver including both H-bridges and sense FETs.

The digital logic and driver 211 include logic 212 coupled to a gate driver 213. The gate driver 213 asserts gate signals Hson1, Hson2, Lson1, and Lson2 for the gates of transistors HS1, HS2, LS1, and LS2, respectively. The comparator 210 includes a positive (+) input, a negative (−) input, and output. The comparator's output is coupled to the digital logic and driver 211. The comparator's positive input is coupled to node B which also represents the drain-to-source voltage of transistor LS2. The gate of transistor LS2 is connected to the gate of the SNS FET, and the drain of the SNS FET is coupled to the negative input of the comparator. The source of the SNS FET is connected to ground.

The sine DAC 121 includes one input that receives microstepping indexer bits (s[n:0]) and another input that receives a reference voltage VREF. The microstepping indexer bits represent control signals for switches internal to the sine DAC 121, as will be discussed below. The microstepping indexer bits are generated based on a DAC code, and FIG. 9 shows an example of a digital core that converts a DAC code to the microstepping indexer bits. In one example, the DAC code is a 3-bit binary value, and the corresponding indexer bits comprise 8 bits. The output of the sine DAC 121 is labeled Vsine and is coupled to an input of the Vtol converter 214. The output of the Vtol converter 214 is coupled to the drain of the SNS FET and to the negative input of the comparator 210.

Figure 3:
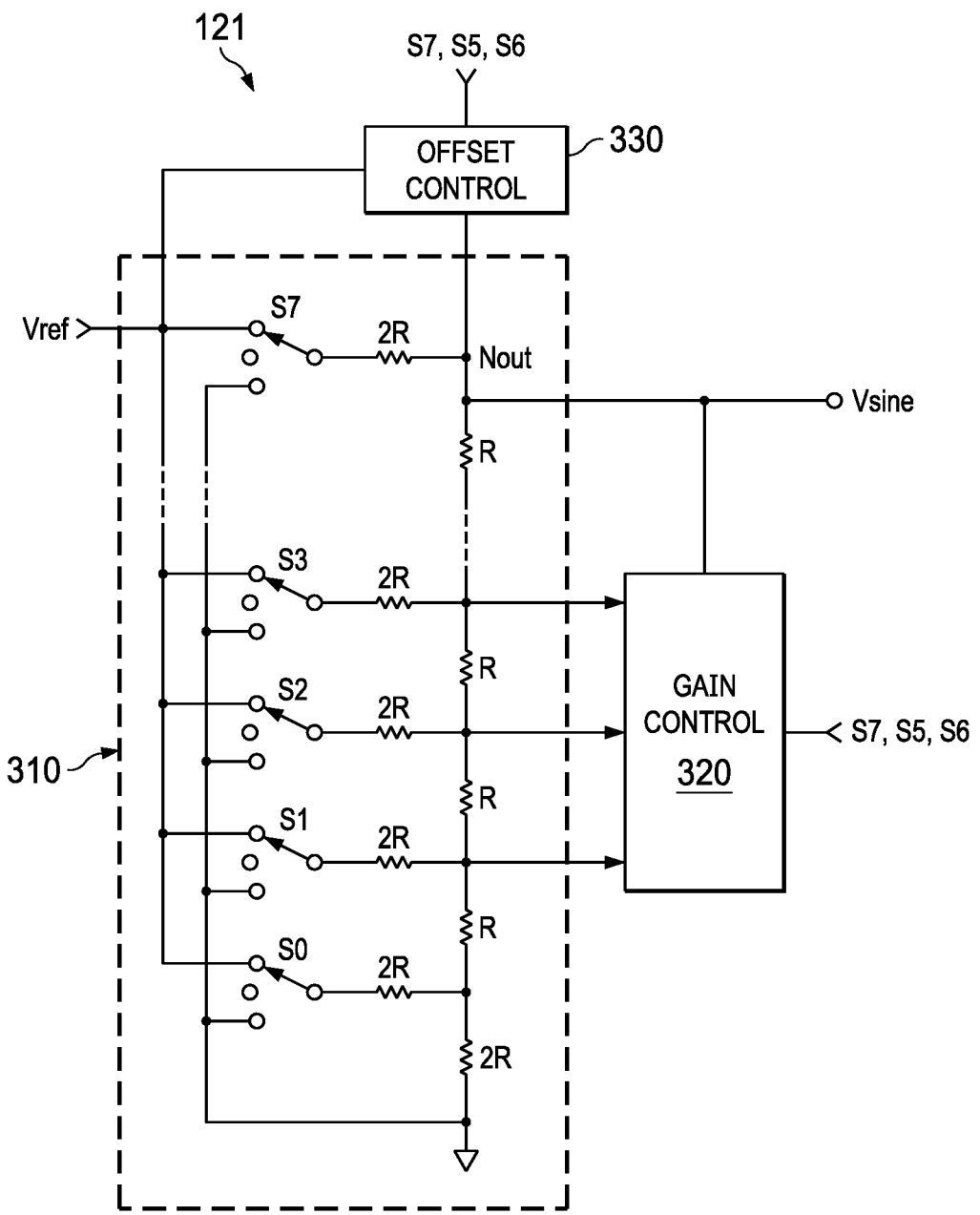
FIG. 3 shows an example of a sine DAC including an R-2R network, a gain control circuit, and an offset control circuit.

FIG. 3 shows an example implementation of the sine DAC 121. This example includes an R-2R network 310, a gain control circuit 320, and an offset control circuit 330. The gain and offset control circuits 320 and 330 are coupled to the R-2R network. The R-2R network 310 comprises repeating instances of a unit resistor R coupled to a 2R resistor. The unit resistors R may comprise a single resistor with a resistance of R or multiple resistors in series or in parallel with an effective resistance of R. The unit resistors are coupled in series between node Nout and ground as shown, and a 2R resistor is coupled to each node between adjacent unit resistors R. Each 2R resistor is coupled to a switch, which is operative to electrically couple the respective 2R resistor to either the reference voltage VREF or to ground. The microstepping indexer bits control the switches. The example of FIG. 3 includes eight switches and eight microstepping indexer bitss [7:0]. The voltage on node Nout represents the Vsine output of the sine DAC.

Figure 4:
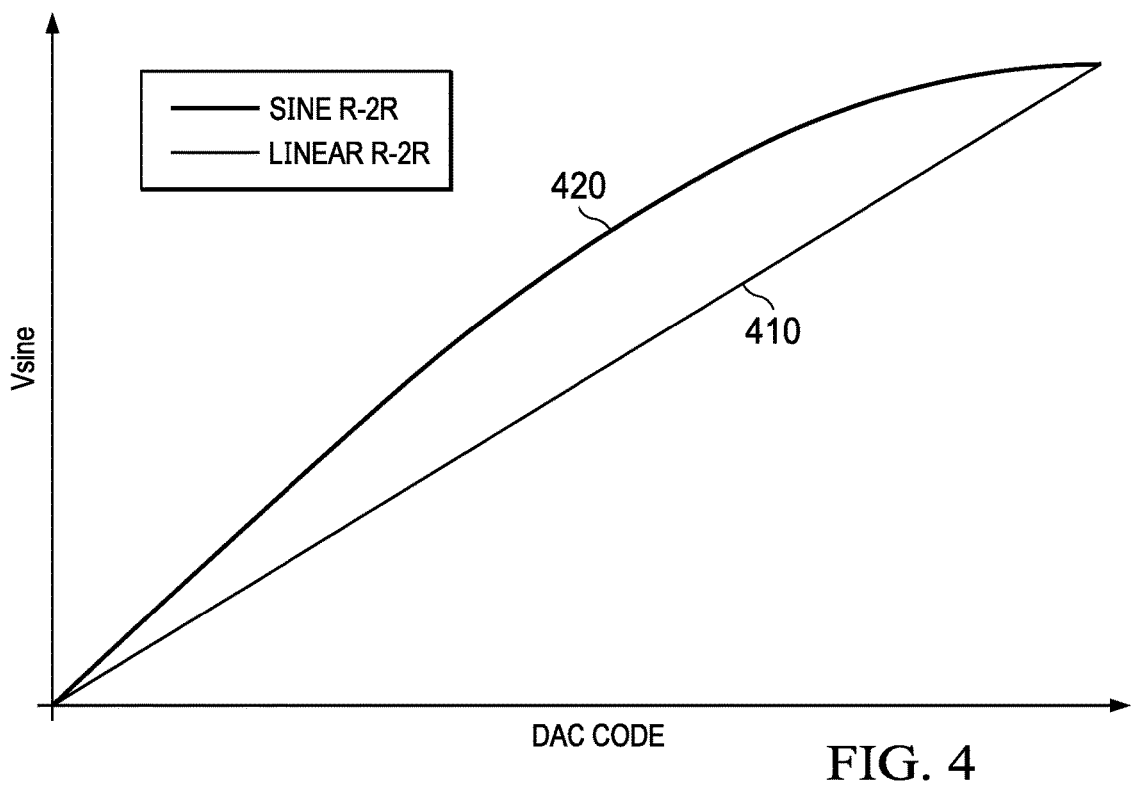
FIG. 4 shows a DAC output versus digital code input linear relationship for an R-2R network and a desired sinusoidal relationship implemented for the sine DAC.

Absent the gain and offset control circuits 320 and 330, the relationship between digital code and Vsine is linear as shown by 410 in FIG. 4. However, what is desired for proper operation of a stepper motor is for the relationship between DAC code and Vsine to be sinusoidal as illustrated by sinusoidal curve 420. The gain control circuit 320 operates to modify the slope of the Vsine-DAC code relationship and the offset control circuit 330 operates to introduce an offset where needed in order to create a piece-wise linear, approximately sinusoidal relationship between Vsine and DAC as illustrated in FIG. 5.

Figure 5:
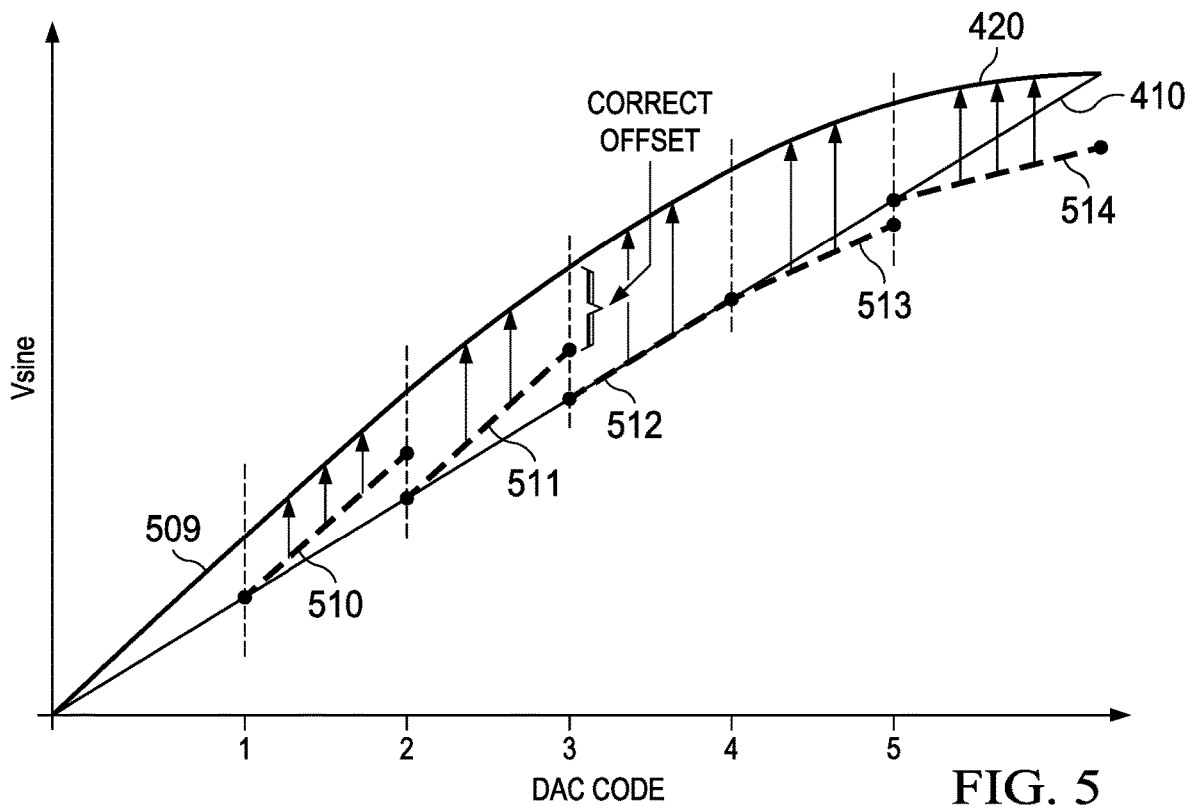
FIG. 5 illustrates the piece-wise linear relationship implemented using the gain and offset control circuits.
Figure 6:
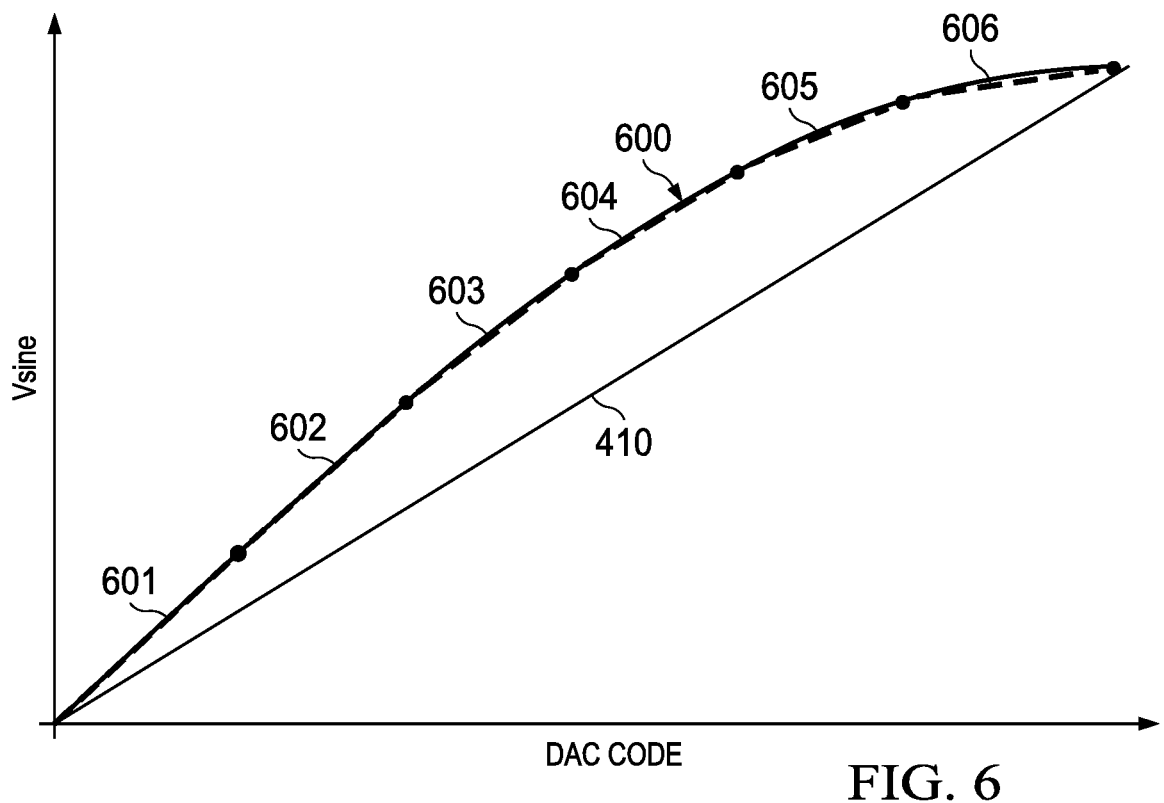
FIG. 6 further illustrates the piece-wise linear relationship implemented using the gain and offset control circuits.

Referring to FIG. 5, the linear relationship 410 and the desired sinusoidal relationship are repeated from FIG. 4. FIG. 5 also illustrates piece-wise linear segments 509, 510, 51, 512, 513, and 514 that result from the operation of the gain control circuit 320. As shown, the gain (slope) of the Vsine-DAC code relationship can be varied across the DAC codes through use of the gain control circuit 320. Initially (i.e., at a DAC code of 0), the slope of the Vsine-DAC code relationship (509) is larger than the slope inherent to the linear R-2R network. When the DAC code increases to the next code (e.g., 1), an offset is created and the offset control circuit 330 counteracts the offset to "push" the piece-wise linear segment 510 upward to track the general contour of the desired sinusoidal curve 420. At each DAC code, the gain control circuit 320 modifies the slope inherent to the R-2R network by a desired amount and the offset control circuit 330 introduces an appropriate amount of offset so that the resulting piece-wise linear segments approximate sinusoidal curve 420. FIG. 6 shows an example of a relationship 600 between Vsine and DAC code comprising piece-wise linear 601, 602, 603, 604, 605, and 606. The relationship 600 approximates a sinusoid. Among other factors, the amount of the gain modification and offset for each piece-wise linear segment depends on the number of steps implemented by the stepper driver 120 and the desired accuracy. Thus, the amount of gain and offset control is application-specific.

Figure 7:
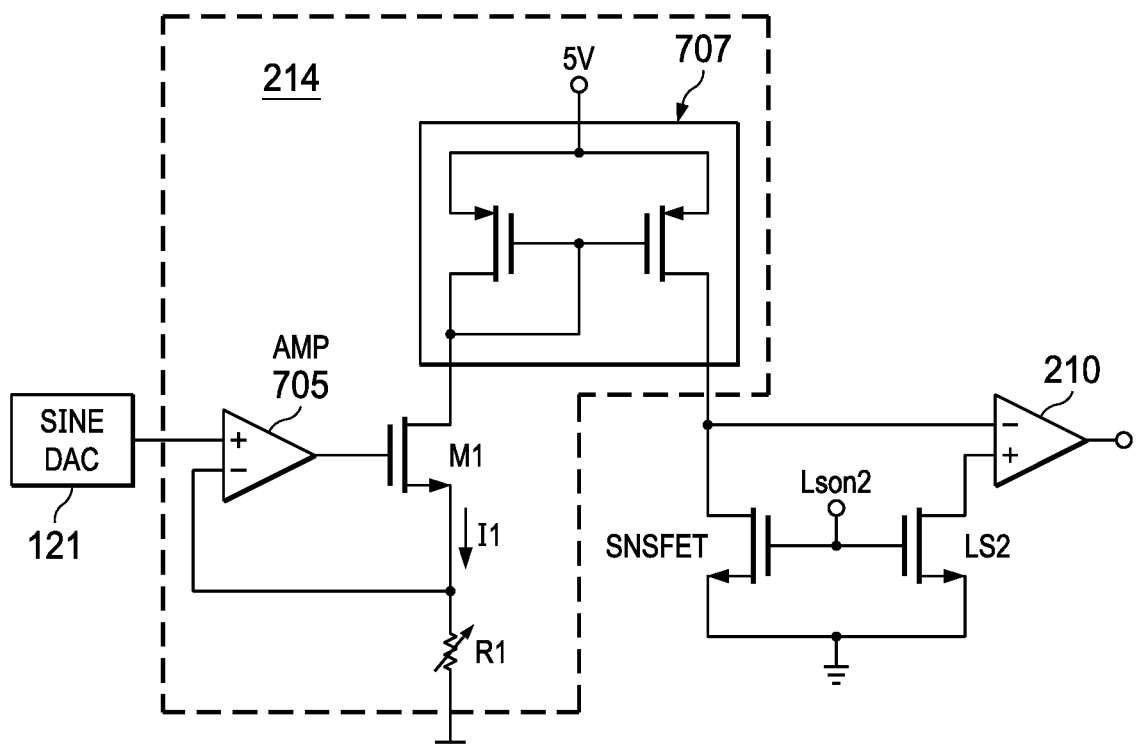
FIG. 7 shows an example of a voltage-to-current converter usable in the example stepper driver of FIG. 2.

FIG. 7 shows an example of the Vtol converter 214. The Vtol converter 214 in this example includes an amplifier 705, a current mirror 707, a transistor M1, and a trimmable resistor R1. The positive input of the amplifier 705 is coupled to the output of the sine DAC 121. The output of the amplifier 705 is coupled to the gate of M1 (which is an NMOS device in this example). The current mirror 707 comprises a pair of PMOS devices which mirror the current through SNS FET. The R1 (and thus voltage across R1) is coupled to the negative input of amplifier 705. The Vtol converter 214 generates I1 which is mirrored into the SNSFET using the current mirror 707.

Figure 8:
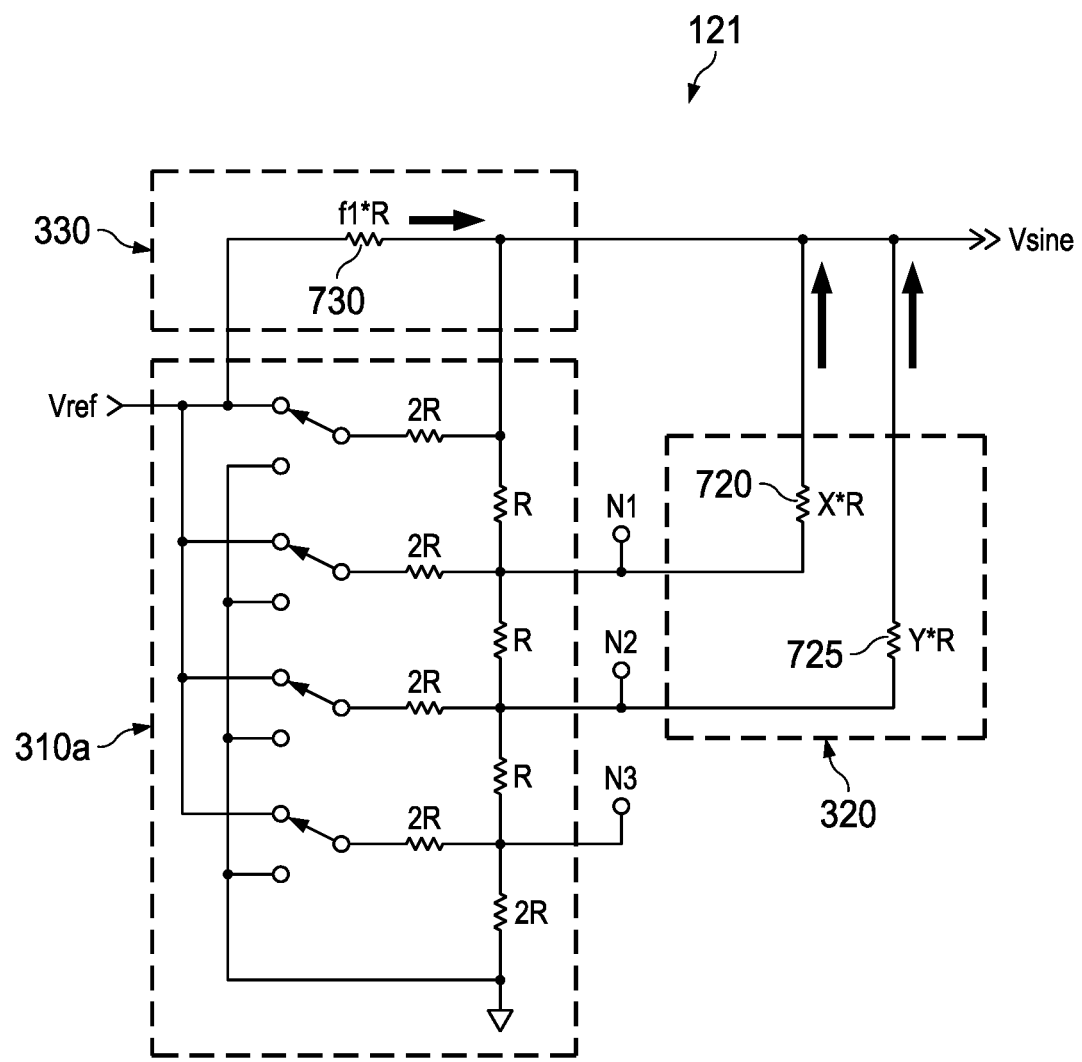
FIG. 8 shows a further example implementation of the sine DAC.

FIG. 8 shows another example of the sine DAC 121 with additional detail shown for the gain control circuit 320 and the offset control circuit 330. The gain control circuit 320 includes multiple resistors. Each resistor is coupled to a different node within the serial chain of unit resistances R. This example is for a two-bit DAC code and thus the R-2R network 310a in this example includes four switches coupled to the 2R resistances. As such, the R-2R network 310a includes three inter-resistance R nodes N1, N2, and N3. Of the three nodes N1-N3, however, only nodes N1 and N2 are coupled to respective resistors 720 and 725 as shown. The resistances 720 and 725 are coupled between Vsine and the R-2R network 310a. Node N3 is not connected to the gain control circuit 320 in this example. Resistor 720 is shown as "X*R" which means that resistance 720 is a function X of the unit resistance. "X" is a function the DAC code. As such, the resistance of resistor 720 may vary from DAC code to DAC code and may even be turned "off" for certain DAC codes (e.g. decoupled from node N1). Similarly, resistor 725 is Y*R, where Y is a different function of the DAC code than X. The offset control circuit 320 also includes a configurable resistor 730, and its resistance is f1*R, where f1 is a function of the DAC code different from X and Y. Resistor 730 is connected between VREF and Vsine as shown.

FIG. 9 shows an example of a sine DAC 821. Sine DAC 821 in this example includes an R-2R network 810, a gain control circuit 820, and an offset control circuit 830. Switches SW selectively connect each 2R resistor to either VREF or ground as shown and as described above, thereby implementing a linear R-2R DAC. Resistors R (along with one 2R resistor) are connected in series between Vsine and ground. The nodes between the resistors R are labeled NODE21-NODE26 as shown. In this example, the DAC is a 3-bit binary value and thus there are eight 2R resistances and eight corresponding switches SW. The 3-bit DAC code is decoded into eight bits with each bit controlling a respective switch of the switches SW.

The gain control circuit 820 includes resistors R20-R29 and switches SW1-SW8. Resistors R20, R21, R22, R23, and R24 are connected in series between NODE25 and SW1. Resistors R25 and R25 are connected in parallel. Resistors R20, R21, R22, R23, R24, and the parallel combination of R25 and R26 are connected in series between NODE25 and SW2. The node between resistors R21 and R22 is connected to switch SW3, and thus resistors R20 and R21 are connected in series between NODE25 and switch SW3. Resistors R20, R21, R22, R23, and R24 are connected in series between NODE25 and SW4. Resistors R27, R28, and R29 are connected in series between NODE24 and SW5 and are also connected in series between NODE24 and switch SW6. The node between resistors R27 and R28 is connected to switch SW7 and thus resistor R27 is connected between NODE24 and switch SW7. The node between resistors R20 and R21 is connected to switch SW8 and thus resistor R20 is connected between NODE25 and switch SW8. In one example, the unit resistances (R) equal 100 Kohms and the 2R resistances equal 200 Kohms. The resistances comprising R20-R29 may be implemented using unit resistors (e.g., 100 Kohms) combined in series and in parallel to form different resistances. That is, R20-R29 may be the same or different resistances and are application-specific. In one example, SW1 to SW8 have different resistances coupled between the switch and the corresponding NODE. To save area, one or more of the resistors are reused for multiple switches. For example, if SW3 requires 2R between SW3 and NODE25, instead of connecting 2R from SW8 to NODE25, a 2R that was used for SW1 is reused as SW1 is off when SW3 is on. The reuse of resistors to save area also is implemented for the offset control circuit 830.

Based on the state of at least some of the bits of the DAC code, control signals for SW1-SW16 are generated to thereby couple particular resistance values between Vsine and various internal nodes of the R-2R network 810 thereby providing a predetermined amount of gain as explained above.

Offset control circuit 830 in the example FIG. 9 includes resistors R30-R42 and switches SW11-SW6. Resistors R30, R31, R32, R33, R34. R35, R36, R37, and R38 are connected in series between VREF and switch SW11. Resistors R30, R31, R32, R33, R34. R35, R36, and R37 are connected in series between VREF and switch SW12. Resistors R30-R35 are connected in series between VREF and switch SW13. Resistors R38 and R40 are connected in series and in parallel with resistor R31. Similarly, resistors R41 and R42 are connected in series and in parallel with resistor R33. Resistors R30-R33 are connected in series (and with R41 and R42 connected in series and in parallel with R33) between VREF and switch SW14. Resistors R30 and R31 are connected in series (with R39 and R40 connected in series and in parallel with R31) between VREF and switch SW15. Resistor R30 is connected in between VREEF and switch SW16. In one example, each of R30-R42 comprises a resistance of 25 Kohms. The control signals that control switches SW11-SW16 are the same signals that control switches SW3-SW8, respectively. As only one of SW3-SW8 is on at any given time, resistors used for SW3 are reused when SW3 is off to save significant area compared to what would be the case if the same resistors were not used for different switches.

Figure 10:
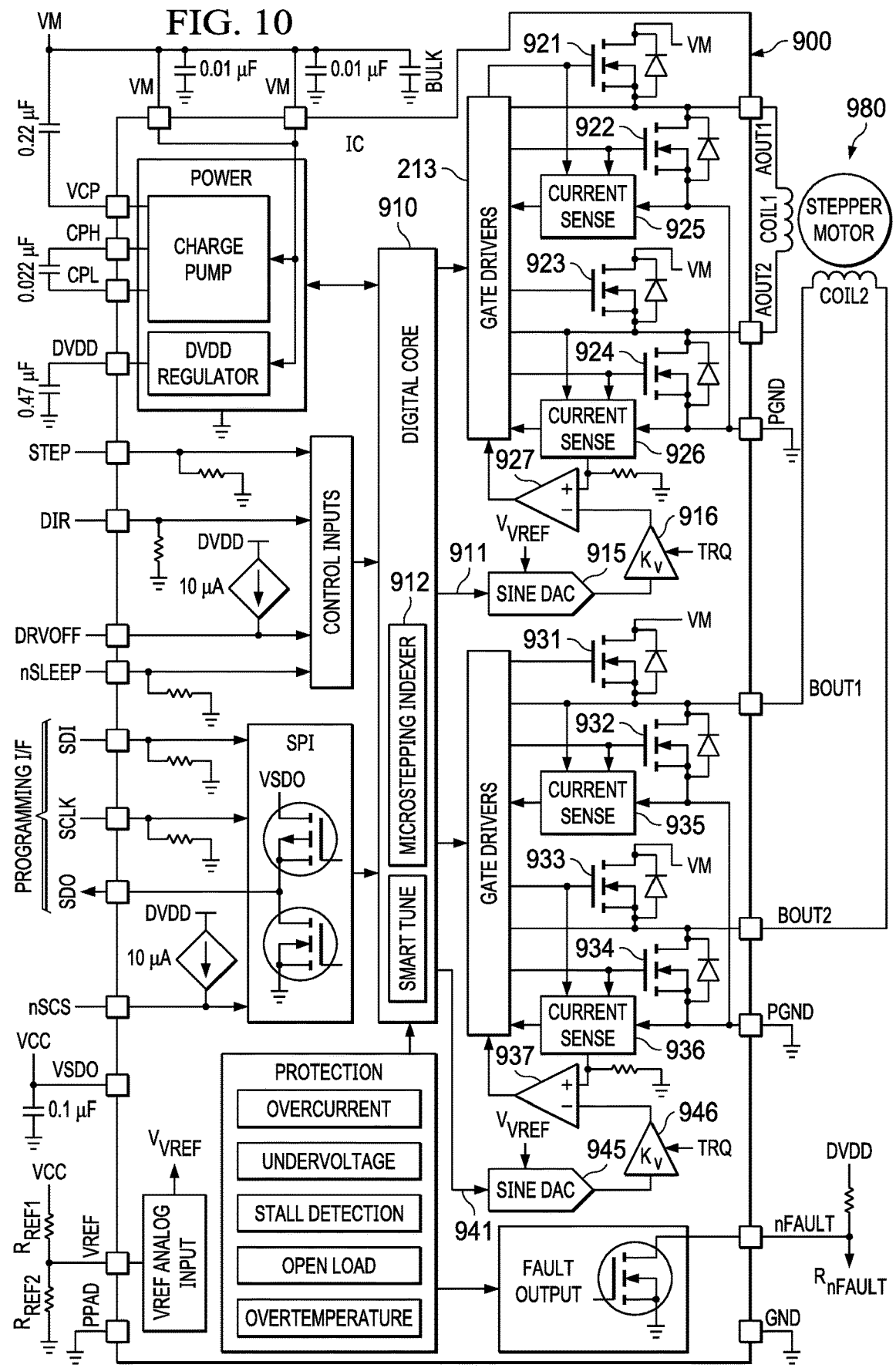
FIG. 10 shows an example implementation of a stepper driver integrated circuit (IC) including multiple sine DACs.

FIG. 10 illustrates another example of a stepper driver integrated circuit (IC) 900 for controlling a stepper motor 980. COIL1 of the stepper motor 980 is controlled by one H-bridge, senses 925 and 926, a sine DAC 915, a Vtol converter 916, and a comparator 927. The H-bridge for COIL1 comprises FETs 921, 922, 923, and 924 where FETs 921 and 923 represent the high side FETs and FETs 922 and 924 represent the low side FETs. Digital core 910 generates and/or otherwise receives a DAC code for the stepper motor 980 and decodes the DAC code to generate the microstepping indexer bits. Sine DAC 915 is coupled to digital core 910 by way of signal line(s) 911 which provide the microstepping indexer bits to the sine DAC.

A generally identical set of components is included with the stepper driver IC 900 to drive COIL2. COIL2 of the stepper motor 980 is controlled by another H-bridge, senses 935 and 936, a sine DAC 945, a Vtol converter 946, and a comparator 937. The H-bridge for COIL2 comprises FETs 931, 932, 933, and 934 where FETs 931 and 933 represent the high side FETs and FETs 932 and 934 represent the low side FETs. Sine DAC 945 is coupled to digital core 910 by way of signal line(s) 941 which provide the microstepping indexer bits to the sine DAC 945.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:
1. A stepper driver for a motor, comprising:
an H-bridge;
a sense transistor coupled to the H-bridge;
a voltage-to-current (Vtol) converter having Vtol converter input and a Vtol converter output, the Vtol converter output coupled to the sense transistor; and
a sine digital-to-analog converter (DAC) having a sine DAC digital input, a reference input, and a sine DAC output, the sine DAC output coupled to the Vtol converter input, the sine DAC comprising an R-2R network, an offset control circuit coupled to the R-2R network, and a gain control circuit also coupled to the R-2R network.
2. The stepper driver of claim 1, wherein
the gain control circuit comprises a first plurality of resistors and a second plurality of switches; and each switch of the second plurality of switches is coupled to at least one resistor of the first plurality of resistors.

3. The stepper driver of claim 1, wherein
the gain control circuit comprises a first plurality of resistors and a second plurality of switches;
the switches of the second plurality of switches are coupled together at the sine DAC output;
a first resistor of the first plurality of resistors is coupled to a first node within the R-2R network;
a second resistor of the first plurality of resistors is coupled to a second node within the R-2R network; and
each switch of the second plurality of switches is coupled to at least one resistor of the first plurality of resistors.

4. The stepper driver of claim 1, wherein the gain control circuit is configured to adjust a gain of the sine DAC based on a digital code provided to the sine DAC.

5. The stepper driver of claim 1, wherein:
the offset control circuit comprises a first plurality of resistors and a second plurality of switches;
at least one of the first plurality of resistors is coupled to the reference input; and
the switches of the second plurality of switches are coupled together at the sine DAC output.

6. The stepper driver of claim 1, wherein:
the offset control circuit comprises a first plurality of resistors and a second plurality of switches;
at least one of the first plurality of resistors is coupled to the reference input;
each switch of the second plurality of switches is coupled to at least one resistor of the first plurality of resistors; and
the switches of the second plurality of switches are coupled together at the sine DAC output.

7. The stepper driver of claim 1, wherein the offset control circuit is configured to adjust an offset of the sine DAC based on a digital code provided to the sine DAC.

8. The stepper driver of claim 1, further comprising a comparator having a first comparator input and a second comparator input, the first comparator input couple to the H-bridge, and the second comparator input coupled to the sense transistor and to the Vtol converter output.

9. A stepper driver for a motor, comprising:
an H-bridge configured to provide current to a motor coil;
a sense transistor coupled to the H-bridge, the sense transistor configured to sense the current of the motor coil;
a voltage-to-current (Vtol) converter having Vtol converter input and a Vtol converter output, the Vtol converter output coupled to the sense transistor; and
a sine digital-to-analog converter (DAC) having a sine DAC digital input, a reference input, and a sine DAC output, the sine DAC output coupled to the Vtol converter input, the sine DAC comprising an R-2R network, an offset control circuit coupled to the R-2R network, and a gain control circuit also coupled to the R-2R network, the gain control circuit is configured to adjust a gain of the sine DAC based on a digital code provided to the sine DAC.

10. The stepper driver of claim 9, wherein
the gain control circuit comprises a first plurality of resistors and a second plurality of switches; and
each switch of the second plurality of switches is coupled to at least one resistor of the first plurality of resistors.

11. The stepper driver of claim 9, wherein
the gain control circuit comprises a first plurality of resistors and a second plurality of switches;
the switches of the second plurality of switches are coupled together at the sine DAC output;
a first resistor of the first plurality of resistors is coupled to a first node within the R-2R network;
a second resistor of the first plurality of resistors is coupled to a second node within the R-2R network; and
each switch of the second plurality of switches is coupled to at least one resistor of the first plurality of resistors.

12. The stepper driver of claim 9, wherein:
the offset control circuit comprises a first plurality of resistors and a second plurality of switches;
at least one of the first plurality of resistors is coupled to the reference input; and
the switches of the second plurality of switches are coupled together at the sine DAC output.

13. The stepper driver of claim 9, wherein:
the offset control circuit comprises a first plurality of resistors and a second plurality of switches;
at least one of the first plurality of resistors is coupled to the reference input;
each switch of the second plurality of switches is coupled to at least one resistor of the first plurality of resistors; and
the switches of the second plurality of switches are coupled together at the sine DAC output.

14. The stepper driver of claim 9, further comprising a comparator having a first comparator input and a second comparator input, the first comparator input couple to the H-bridge, and the second comparator input coupled to the sense transistor and to the Vtol converter output.

15. A system, comprising:
a stepper motor;
a stepper driver comprising:
an H-bridge coupled to the stepper motor;
a sense transistor coupled to the H-bridge;
a voltage-to-current (Vtol) converter having Vtol converter input and a Vtol converter output, the Vtol converter output coupled to the sense transistor; and
a sine digital-to-analog converter (DAC) having a sine DAC digital input, a reference input, and a sine DAC output, the sine DAC output coupled to the Vtol converter input, the sine DAC comprising an R-2R network, an offset control circuit coupled to the R-2R network, and a gain control circuit also coupled to the R-2R network.

16. The system of claim 15, wherein:
the gain control circuit is configured to adjust a gain of the sine DAC based on a digital code provided to the sine DAC; and
the offset control circuit is configured to adjust an offset of the sine DAC based on a digital code provided to the sine DAC.

17. The system of claim 15, wherein:
the gain control circuit comprises a first plurality of resistors and a second plurality of switches;
the switches of the second plurality of switches are coupled together at the sine DAC output;
a first resistor of the first plurality of resistors is coupled to a first node within the R-2R network;
a second resistor of the first plurality of resistors is coupled to a second node within the R-2R network; and
each switch of the second plurality of switches is coupled to at least one resistor of the first plurality of resistors.

18. The system of claim 17, wherein:
the offset control circuit comprises a first plurality of resistors and a second plurality of switches;

at least one of the first plurality of resistors is coupled to the reference input;

each switch of the second plurality of switches is coupled to at least one resistor of the first plurality of resistors; and the switches of the second plurality of switches are coupled together at the sine DAC output.

19. The system of claim 17, wherein the stepper driver is configured to implement at least one of $\frac{1}{32}$, $\frac{1}{64}$, $\frac{1}{128}$, $\frac{1}{256}$, $\frac{1}{512}$, $\frac{1}{1024}$, and $\frac{1}{2148}$, and $\frac{1}{4196}$ micro-stepping.

20. The system of claim 15, wherein the stepper motor includes a first coil and a second coil, and the H-bridge, sense transistor, Vtol converter, and sine DAC is for first coil, and the stepper driver further includes a second combination of an H-bridge, a sense transistor, a Vtol converter, and a sine DAC for second coil.

* * * * *